Patented July 29, 1969

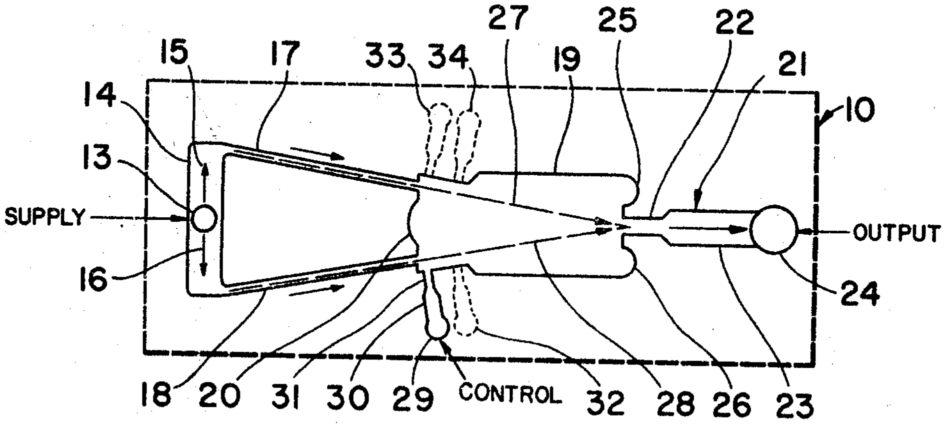
FIG. I
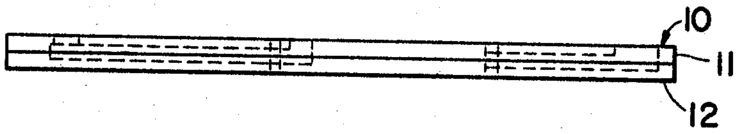
FIG. II
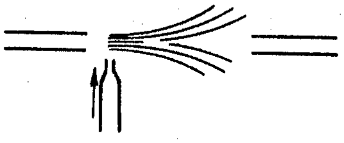
FIG. XI
INVENTOR.
HANS-DIETER KINNER
BY
Lawrence H. Poston
AGENT July 29, 1969 HANS-DIETER KINNER 3,457,934
FLUID DIFFUSION AMPLIFIER
Filed March 7, 1967 5 Sheets-Sheet 2
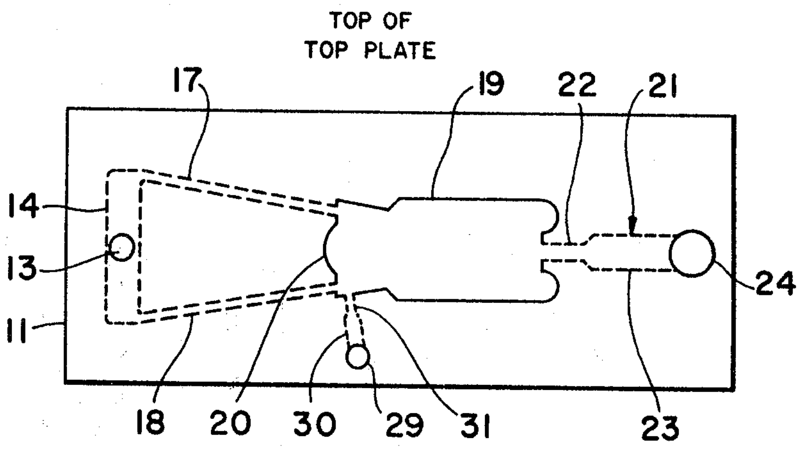
FIG. III
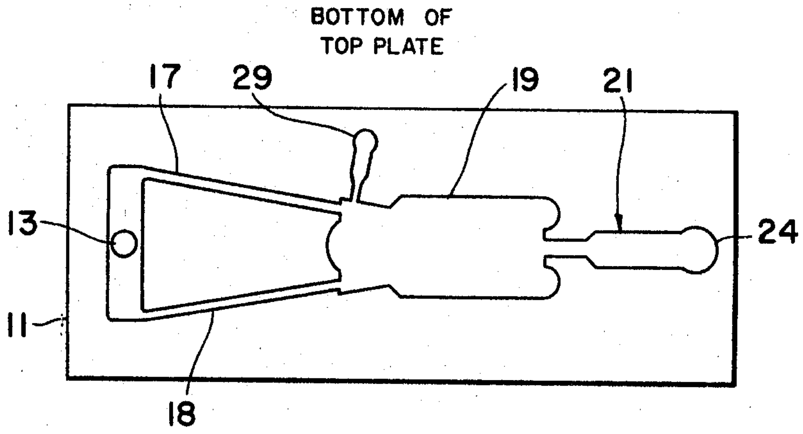
FIG. IV
INVENTOR.
HANS-DIETER KINNER
BY
Lawrence H. Poeton
AGENT

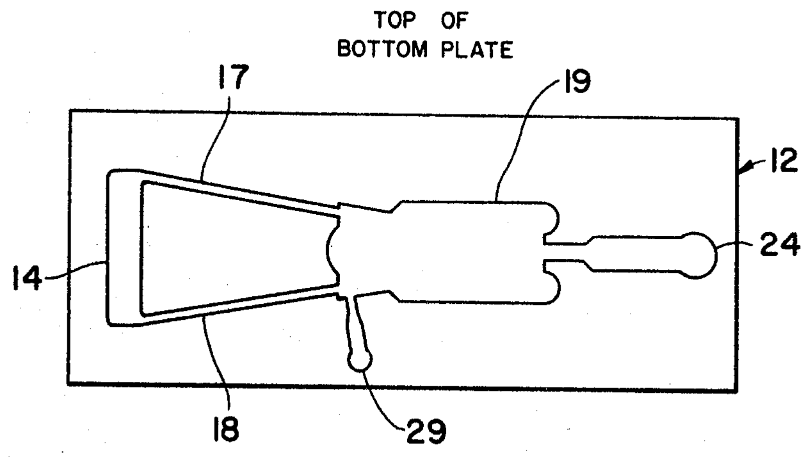
FIG. V
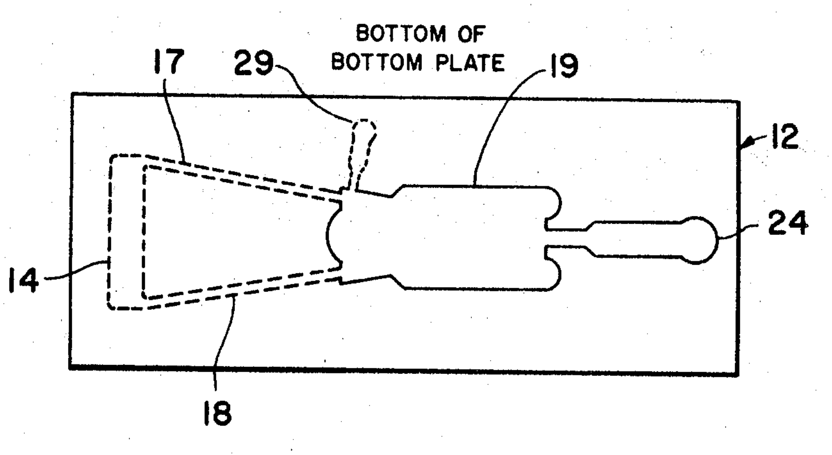
FIG. VI
INVENTOR.
HANS-DIETER KINNER
BY
Lawrence H. Poeton
AGENT July 29, 1969 HANS-DIETER KINNER 3,457,934
FLUID DIFFUSION AMPLIFIER
Filed March 7, 1967 5 Sheets-Sheet 4
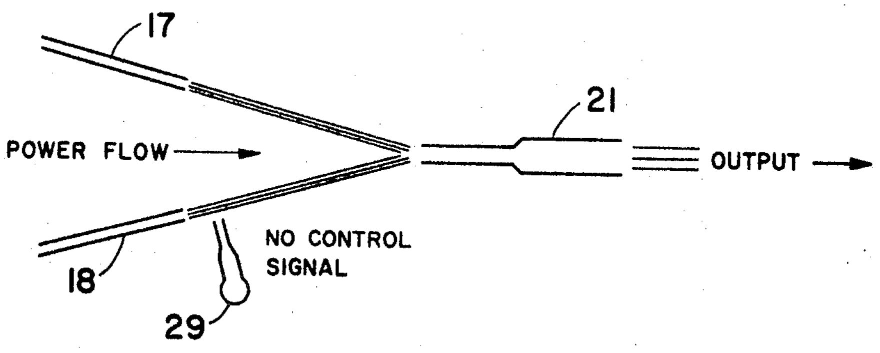
FIG. VII
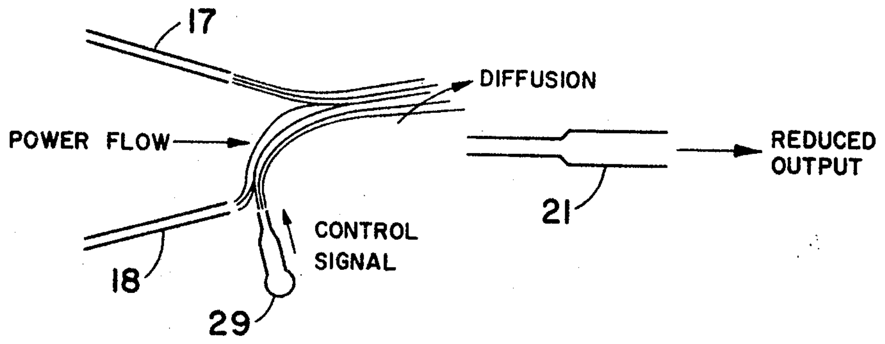
FIG. VIII
INVENTOR.
HANS-DIETER KINNER
BY
Lawrence H. Poeton
AGENT

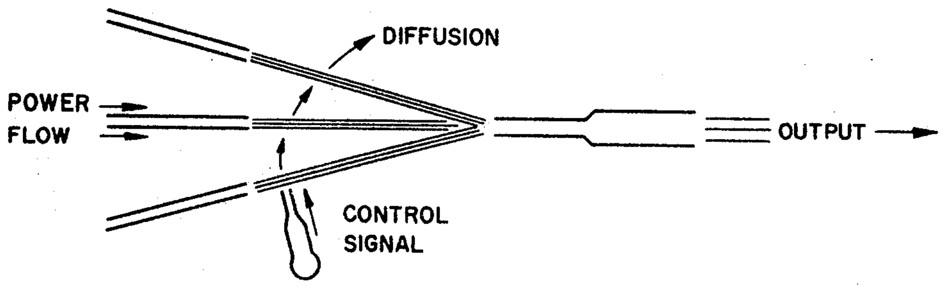
FIG. IX
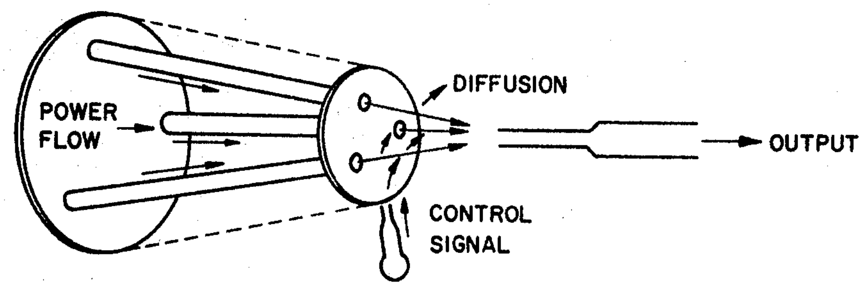
FIG. X
INVENTOR.
HANS-DIETER KINNER
BY
Lawrence H. Poston
AGENT United States Patent Office 3,457,934

3,457,934

FLUID DIFFUSION AMPLIFIER

Hans-Dieter Kinner, Attleboro, Mass., assignor to The Foxboro Company, Foxboro, Mass., a corporation of Massachusetts Filed Mar. 7, 1967, Ser. No. 621,191
Int. Cl. F15c *1/10;* F15d *1/14*
U.S. Cl. 137—81.5 3 Claims

ABSTRACT OF THE DISCLOSURE

A fluid diffusion amplifier with more than one power stream exiting into a single output. A control jet against one stream results in diffusion of that stream and at least one other power stream.

This invention relates to fluid amplifiers in the category variously termed pure fluid devices, fluid logic devices, and the like. The invention is particularly concerned with fluid diffusion amplifiers. While various fluids are acceptable, the operating fluid is, ordinarily, air.

A fluid diffusion amplifier directs a stream of power fluid from an input conduit, across an open space and into an output conduit. A pilot type of control fluid jet is directed transversely against the power stream while the power stream is in the open space. The result is diffusion of the power stream and a consequent significant reduction of power stream in the output conduit. Thus the output can be, for example, in the computer sense of one or zero, as the control signal is zero or one.

The usual form of diffusion amplifier uses a straight input conduit of sufficient length to establish laminar flow of sufficient force to project power flow across a substantial open space without any significant loss of form or character. The entrance to an output conduit is placed in alignment with the input conduit on the other side of the open space, at a point which is, on the free power flow stream, just prior to the point of natural break-up, that is, the point where the stream would diffuse by itself, due to loss of cohesive power.

This arrangement provides a very useful situation for the application of a small pilot, triggering force to the open power stream. In this manner, diffusion may be caused at will prior to the entrance of the power stream into the output. Accordingly, a small fluid jet control signal is applied, in the open space, transversely against the free flowing power stream.

The most critical area for the application of the control jet is adjacent the exit of the power stream. It is here that the smallest control jet can produce the greatest diffusion effect. However, for various purposes, a control jet may be applied anywhere along the free power stream. Further, more than one control jet, or the equivalent thereof may be used for various control, computer, or combination purposes, as desired.

A critical parameter of a diffusion fluid amplifier is the length of the input conduit, and its diameter, straightness, internal surface smoothness and the like. The length and size of the open space, the dimensions, location and position of the output pipe, the size, location, and power of the control fluid input, the power of the power flow, and the nature of the fluid used, are further parameters.

These parameters are related in a particular design to give the desired amplifier result. As in any amplifier, consideration of the ratio of the pilot control signal to the output is a gain factor of major importance. For a fluid diffusion amplifier there is a maximum gain dependent on the possible or desired combination of the above parameters.

This invention provides high gain in a single module by using more than one power stream and by using a single control jet to diffuse more than one power stream. Ordinarily it is preferable to apply the control jet to one power stream and direct the resultant diffusion against another power stream to cause a second, or more, power diffusion. However, the single control input can be simultaneously applied to both power streams if desired.

It is, accordingly, an object of this invention to provide a new and useful diffusion fluid amplifier which is suitable for a variety of applications and which is capable of single module, fast achievement of high gain.

Other objects and advantages of this invention will be in part apparent and in part pointed out hereinafter and in the accompanying drawings, in which;

FIGURE I is an illustration of a fluid diffusion amplifier according to this invention. For clarity, the body is in dotted outline and one form of functioning passage complex is shown in full lines;

FIGURE II is a front edge view of the actual structure of FIGURE I, illustrating the two plate assembly;

FIGURE III, IV, V and VI are views of the plate structures of FIGURES I and II;

FIGURE VII is a schematic illustration of this invention with no control signal;

FIGURE VIII shows the effect of a control signal on the system of FIGURE VIII;

FIGURE IX illustrates this invention with three power inputs in a single plane;

FIGURE X illustrates this invention with three power inputs essentially defining a truncated pyramid of cone; and FIGURE XI illustrates the diffusion, in all directions.

An example of the structure according to this invention is shown in FIGURES I through VI. This structure is a thin rectangular body 10 which may be made small, for example of the order of an inch in length. It is made up of two thin plates 11 and 12, which are the same size and shape epoxy joined together in a face-to-face layer arrangement as shown in the FIGURE II edge view.

In FIGURE I, the overall body 10 is outlined by a dotted line and the operating passages shown in full lines. This is illustrative only. The actual views of the top and bottom of each of the plates are shown as FIGURES III through VI. The openings and conduit passages are formed by etching. As may be seen in FIGURE II, the same passages are etched in the top of the bottom plate 12 and in the bottom of the top plate 11. Thus, when the plates are joined and the passages are matched up, the passages have overall essentially round cross-section which is desirable for laminar flow.

In FIGURE I, the operating system starts at the left with the fluid power supply inlet 13. This inlet extends through the top plate and is relatively large to provide for full and sufficient power fluid input flow to the system.

A transverse power supply large distribution passage 14 receives power fluid from the inlet 13 and leads it in two opposite directions across the unit as indicated by the arrows 15 and 16. From the ends of the distribution passage 14, two power fluid input small passages 17 and 18 extend lengthwise of the body 10, and angled toward each other.

The input passages 17 and 18 empty into one end of a large central opening 19, substantially rectangular in form. The opening 19 extends all the way through the body 10, and power fluid, when diffused, exits from the body 10 directly from the opening 19.

The left end of the FIGURE I opening 19 is a concave curve 20 between the exits of the input passages 17 and 18, so formed as to aid in directing diffused fluid from the exit of the input passage 18 to the exit of the input passage 17.

The right end of the opening 19 has a central exit in the form of an output passage 21. It has a relatively small and short entrance 22. The output passage is expanded as at 23 and has an exit 24 through the top plate 11. The right end of the opening 19, further, has concave forming 25, 26, on either side of the output entrance 22 as a means of aiding diffusion flow and directing it across rather than into the output entrance 22.

The FIGURE I output entrance 22 is preferably quite precise as to its location, size, and distance across the opening 19 from the exits of the input passages 17 and 18.

The system is calculated to establish laminar power flow in the input passages 17 and 18, with correct force to maintain free flow laminar power streams across the length of the opening 19. The input passages 17 and 18 are so angled toward each other as to achieve intersection just at the entrance 22 of the output passage 21. The entrance 22 is sufficiently large to receive both flow streams in laminar form at the same time. If a system with more than two streams is used, the output must be large enough to receive them all.

The power streams as indicated by arrows 27 and 28 will, by themselves, diffuse just within the output passage 21, in the expanded portion 23 thereof. This without any control signal application. Accordingly, while the power streams 27 and 28 are cohesive and well directed in their free flow across the opening 19, they are nevertheless very delicately balanced, and nearly at the point of natural diffusion when they reach the entrance 22 of the output passage 21. The point of natural breakup is a function of input pressure.

A very small control signal in the form of a fluid jet, is therefore capable of upsetting and diffusing the power streams 27 and 28, when applied transversely thereto. The most delicate area of such control signal application is adjacent the exits of the input passages 17 and 18. This system may thus be designed to operate on the basis of a control signal pressure of a few inches of water.

A control signal supply opening 29 extends through the plate 11, to feed a control passage 30 and jet 31, directed into the opening 19 and at the power stream 28 adjacent the exit of the input passage 18.

Other possible control input systems are indicated at 32, 33 and 34 by dotted lines, since the main operation of this device comprises multiple power streams whose respective diffusions knock their neighboring power streams into diffused condition, the whole sequence being started by the application of one control signal to one power stream. Nevertheless, other control inputs may be useful in various control or computer combinations, and this is the purpose of the control inputs 32, 33 and 34.

FIGURES VII and VIII illustrate the operation of this system from the no control signal, no diffusion situation of FIGURE VII with full output to the control signal in, and the resultant cascading diffusion and reduced output of the situation of FIGURE VIII.

FIGURE IX illustrates a system with three power flow inputs in a single plane and operated by a single control signal. The first diffused stream contacts and diffuses the second, and the second contacts and diffuses the third. The output entrance must be large enough to receive all three streams when not diffused.

To demonstrate the related effects the diffusion is shown as in one direction. In actuality the diffusion spreads in all directions, as in FIGURE XI, and on a low power basis after a short distance.

FIGURE X is an example of a multiple power stream system not limited to a single plane. The power inputs may define any figure of revolution, such as a truncated cone.

This invention, therefore, provides a new and useful fluid diffusion amplifier with the advantage of high gain in a single module. This amplifier lends itself to the miniaturization which is so important in modern computer devices.

I claim:

1. A fluid diffusion amplifier wherein the diffusion of one laminar stream is arranged to impinge on a second laminar stream to cause diffusion of the second laminar stream, this multiple effect resulting from the impingement of a control signal transversely against said one laminar stream, providing a high gain amplifier in a single module, said diffusion amplifier comprising an unobstructed open space, a first power flow input for continuously achieving and directing a laminar first fluid stream into and in free flow across said open space, a second flow input for continuously achieving and directing a laminar second fluid stream into and in free flow across said open space, said second stream directed to be operatively proximate to said first stream within said open space in terms of said second stream being diffusable by contact from diffusion of said first stream, output means from said open space for receiving said streams, and a small control jet input directed to apply a transverse control signal small jet against one of said laminar free flow fluid streams within said open space, said jet being sufficient to cause diffusion of said one of said laminar fluid streams within said open space, with further consequent effect in that the diffusion of said one of said streams is capable of impinging transversely on the other of said laminar free flow streams within said open space to cause diffusion of said other of said laminar streams within said open space, whereby both said laminar streams are diffused and said output is significantly reduced.

2. A fluid diffusion amplifier according to claim 1 wherein said laminar streams intersect each other within said open space and at the entrance to said output means.

3. A fluid diffusion amplifier according to claim 1 wherein several converging laminar stream inputs are arranged in cone defining formation, all directed, across an open space, to a single output essentially at the projected point of convergence of said stream inputs, whereby all of said streams are diffusable by the application of a control signal to one of said streams.

References Cited

UNITED STATES PATENTS

| | | | |
|---|---|---|---|
| 3,080,886 | 3/1963 | Severson | 137—81.5 |
| 3,107,850 | 10/1963 | Warren et al. | 137—81.5 XR |
| 3,182,675 | 5/1965 | Zilberfarb et al. | 137—81.5 |
| 3,212,515 | 10/1965 | Zisfein et al. | 137—81.5 |
| 3,234,955 | 2/1966 | Auger | 137—81.5 |
| 3,262,466 | 7/1966 | Adams et al. | 137—81.5 XR |
| 3,366,131 | 1/1968 | Swartz | 137—81.5 |

SAMUEL SCOTT, Primary Examiner